US011515752B1

(12) United States Patent
    Chen

(10) Patent No.: US 11,515,752 B1
(45) Date of Patent: Nov. 29, 2022

(54) POWER TOOL DEVICE

(71) Applicant: JU HE INDUSTRY CO., LTD., Taichung (TW)

(72) Inventor: Ting-Yuan Chen, Taichung (TW)

(73) Assignee: JU HE INDUSTRY CO., LTD., Taichung (TW)

( * ) Notice: Subject to any disclaimer, the term of this patent is extended or adjusted under 35 U.S.C. 154(b) by 39 days.

(21) Appl. No.: 17/351,439

(22) Filed: Jun. 18, 2021

(51) Int. Cl.
    *H02K 7/00* (2006.01)
    *H02K 7/14* (2006.01)
    *H02K 7/08* (2006.01)
    *B25F 3/00* (2006.01)

(52) U.S. Cl.
    CPC .............. *H02K 7/003* (2013.01); *B25F 3/00* (2013.01); *H02K 7/085* (2013.01); *H02K 7/145* (2013.01)

(58) Field of Classification Search
    CPC .............................. H02K 7/003; H02K 7/085
    USPC ........................................................... 310/50
    See application file for complete search history.

(56) References Cited

U.S. PATENT DOCUMENTS

2005/0230133 A1* 10/2005 Omi .................... B23B 45/008
                                                            173/216

FOREIGN PATENT DOCUMENTS

CN           102371847 A    *   3/2012
CN           112720367 A    *   4/2021

* cited by examiner

*Primary Examiner* — Jose A Gonzalez Quinones
(74) *Attorney, Agent, or Firm* — Muncy, Geissler, Olds & Lowe, P C.

(57) ABSTRACT

A power tool device comprises a housing, a transmission mechanism installed in the housing, and an adapting mechanism deployed with a tool head, a switch member adopted for manipulating the attachment and detachment between the transmission mechanism and the adapting mechanism in a steady and safety manner. Therefore, that the operator only needs to carry a variety of tool heads and a power tool device is ample enough to deal with most of the situations which makes it much easier for the operators to work in a high flexibility and efficiency fashion.

9 Claims, 3 Drawing Sheets

POWER TOOL DEVICE

BACKGROUND

1. Technical Field

The present disclosure is dedicated to general working process, such as wrenching or screwing, exercised by pneumatic or automatic tool devices to make a precise and firm engagement with the tool heads, especially for a variety of tool heads, for the operators to work in a high flexibility and safety fashion.

2. Related Art

The common pneumatic or automatic tool devices, such as drills, angle grinders, engraving grinders ratchet wrenches etc., are for individual purposes, and the operators usually require miscellaneous hand tools at the workplace to ensure a smooth working. Taking several trips to fetch all the requirement which is a nuisance for the operators because they can carry only two items at most at a time.

To defeat the aforementioned default, the present disclosure aims to provide a power tool device compatible with a variety of tools heads to engage in a precise and firm fashion for the operators to exercise in a high flexibility and safety manner.

SUMMARY

To solve the aforementioned problem, the instant disclosure aims to provide a power tool device compatible with a variety of tools heads to engage in a precise and firm fashion for the operators to exercise in a high flexibility and safety manner.

Based on the aforementioned purpose, the instant disclosure discloses a power tool device comprising a housing, a transmission mechanism installed in the housing, an adapting mechanism deployed with a tool head and associated with the transmission mechanism in a detachable manner. The transmission mechanism is sequentially equipped with a motor unit, a connecting member, a guide member, and a switch member. The motor unit is pivoted in the housing and includes a first transmission shaft which forms a polygon shape in sectional view and is engaged with a rotor on its one side and a first bearing on the other side for confining the position of the first transmission shaft.

The connecting member is arranged on one side of the housing and has a side wall forming an accommodating space which makes allowance for the first bearing.

The guide member has a base embracing the side wall, and the base protruding an extending wall which is penetrated with an adaptor hole on its inner wall surface and is engraved with a guide groove on its outer wall surface, and the guide groove forms a shape with one end straight stretching up and the other end slightly stretching down.

The switch member surrounds the outer wall surface of the extending wall and has an aperture which location is corresponding to that of the guide groove, and a bolt inserts into the aperture, moves along the guide groove and therefore leads the switch member to orbit around the guide member accordingly.

Preferably, the switch member is threaded with a threshold and is girdled onto the guide member by a retaining ring.

The adapting mechanism is sequentially deployed with a docking member, a second transmission shaft and a tool chuck, the docking member having one end arranged with a plug which forms a polygon shape, in sectional view, pairing with that of the adaptor hole. The second transmission shaft extends through the connecting member and is embedded with an outlet in a free end of the second transmission shaft, and the outlet which has a polygon shape, in sectional view, coupling with that of the first transmission shaft for making connection.

The tool chuck connects detachably to and orbits synchronously around the second transmission shaft.

DETAILED DESCRIPTION

To make a clear narration of the specific embodiment, the structure and the performance of the instant disclosure, the drawings will be mentioned accordingly.

Figure 1:
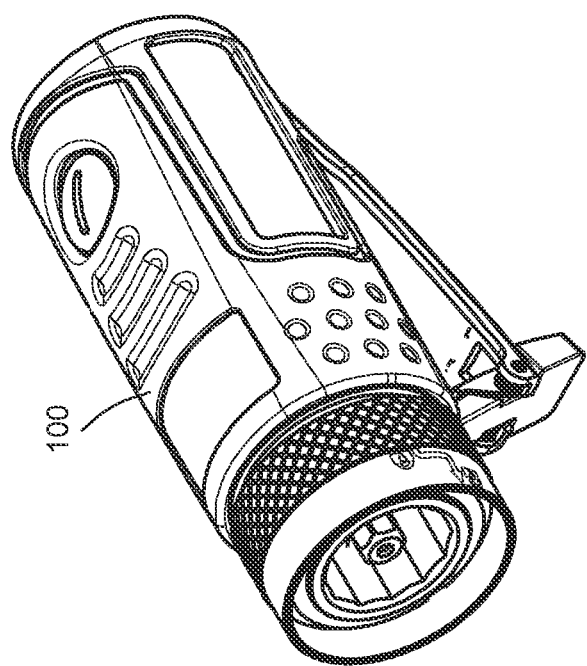
FIG. 1 illustrates an embodiment of the power tool device.
Figure 2:
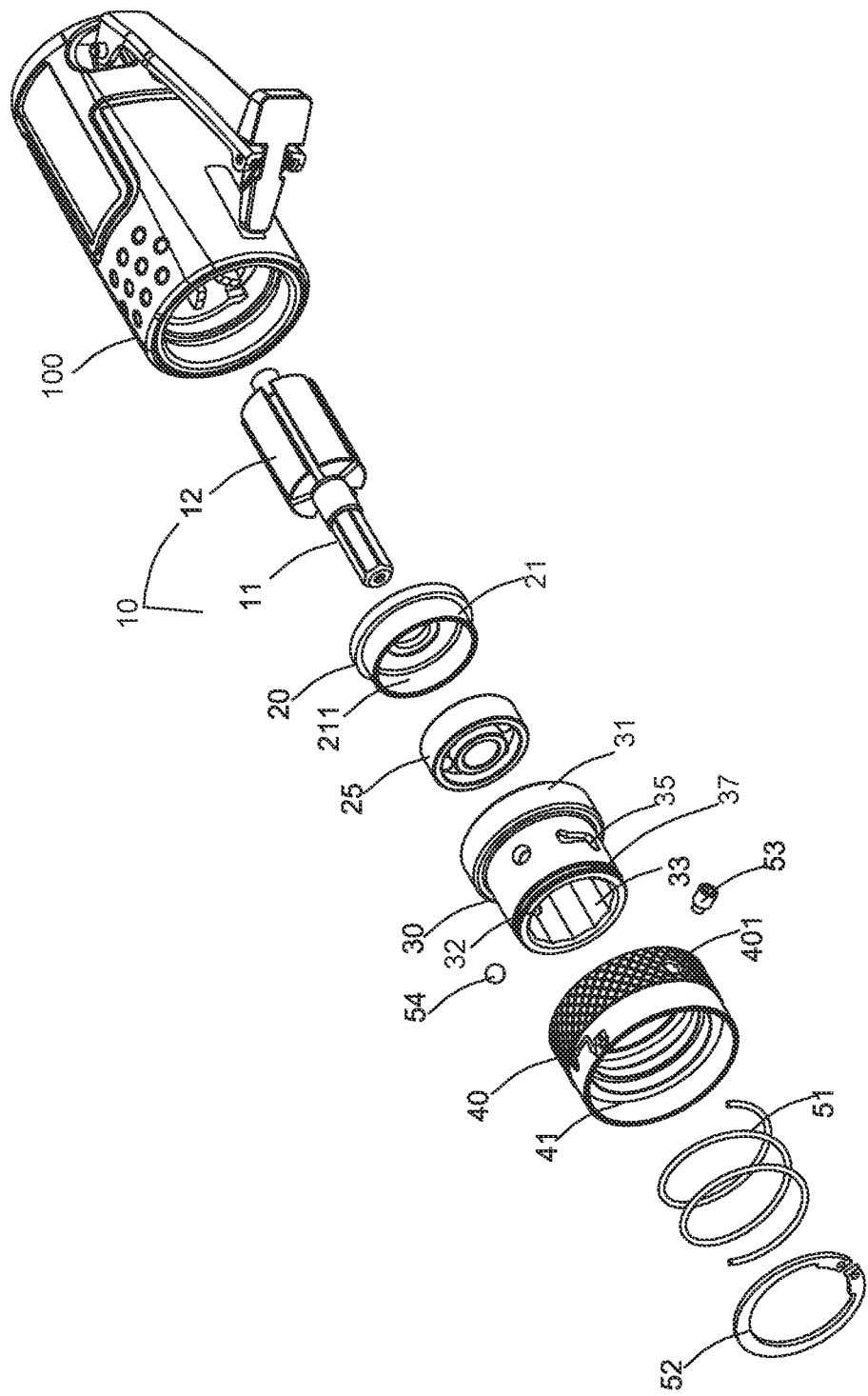
FIG. 2 illustrates an exploded view of this embodiment.

Shown as in FIG. 1 and FIG. 2, the power tool device comprises a housing 100, a transmission mechanism installed in the housing 100, and an adapting mechanism deployed with a tool head 101 and detachably associated with the transmission mechanism. The transmission mechanism is deployed sequentially with a motor unit 10, a connecting member 20, a guide member 30 and a switch member 40. The motor unit 10 is installed in the housing 100 and equipped with a first transmission shaft 11 which forms a polygon shape in sectional view and has one end disposed on a rotor 12 and the other end associated with a first bearing 25 for confining the position of the first transmission shaft 11 and rotating smoothly. The motor unit 10, as the source of power, generates electricity from the housing 100 conveying by way of the first transmission shaft to the adapting mechanism. The connecting member 20 is deployed on one side of the housing 100 and has a side wall forming an accommodating space 211 making allowance for the first bearing 25. The guide member 30 has a base 31 embracing the sidewall 21 and the base 31 protruding an extending wall which is penetrated with an adaptor hole 33 forming a polygon shape in sectional view on the inner wall surface and is engraved circumferentially a guide groove 35. The guide groove 35 forming a shape with one end straight reaching up and the other end slightly stretching down on the outer wall. Besides, the outer wall surface of the extending wall has its upper periphery arranged with a positioning part 37 and girdled by a retaining ring 52.

A steel ball 54 sets into a ball slot 32 of the guide member 30 for confining the position of transmission mechanism and the adapting mechanism.

The switch member 40 manipulates the attaching and detaching positions between the transmission mechanism the adapting mechanism and has an interior divided into an upper chamber and a lower chamber, the lower chamber enfolding the outer wall surface of the extending wall, a bolt 53 inserting into an aperture 401 of the switch member 40, then setting into the guide groove 35, and leading the switch member 40 to move up and down with the assistance of an elastic member 51 which is a spring located in the upper chamber. The switch member 40 is further threaded with a threshold 41 and girdled onto the positioning part 37 of the guide member 30 by a retaining ring 52 for limiting the moving up and down position of the switch member 40 and avoiding the switch member 40 detaching from the guide member 30.

Figure 3:
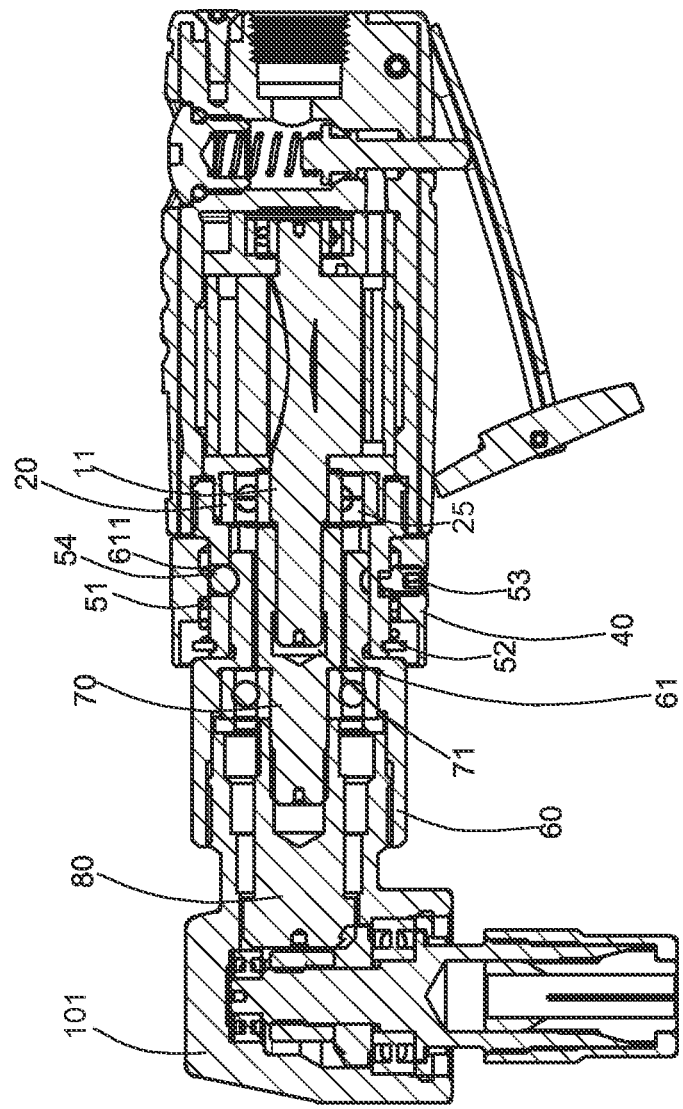
FIG. 3 illustrates a sectional view of the tool head after assembling onto the power tool device of this embodiment.

Shown as in FIG. 3, the adapting mechanism includes a docking member 60, a second transmission shaft 70 and a tool chuck 80, the docking member 60 having one end deployed with a plug 61, the plug 61 which forms a polygon shape pairing with that of the adaptor hole 33 for a steady engagement, and the plug 61 is indented with a slot 611 for refraining the attaching and detaching positions of the steel ball 54.

The second transmission shaft 70 is installed in the docking member 60 in a protruding manner and embedded with an outlet 71 forming in polygon shape, in sectional view, pairing with that of the first transmission shaft 11 for limiting the torque power, transmitted from the first transmission shaft 11 in connection with the second transmission shaft 70, to be used for driving the rotation of the mandrel of the adapting mechanism.

A tool chuck 80 connects detachably to and rotates synchronously with the second transmission shaft 70.

Shown as in FIG. 3, when working, the standard steps of assemble tool head onto the power tool device is: to choose a proper tool head, insert the plug 61 into the adaptor hole 33 of the power tool device, press down the switch member 40 then the bolt 53 is forced to move along the guide groove 35 and slide into the lower slot and rotate the switch member 40, then the steel ball 54 is pushed entering the slot 611 of the plug 61 for engagement which enhances a firm connection between the adapting mechanism and the transmission mechanism, and when the power is on, the first transmission shaft 11 of the power unit 10 associates with the second transmission shaft 70 and the tool chuck 80 for driving a rotation of the tool chuck.

When disarming the tool head 101, the operator pushes up the switch member 40, the bolt 53 is forced to move along the guide groove 35, slide into the upper slot, and pull the plug 61 out of the adaptor hole 33; during this progress, the plug 61 pushes the steel ball 54 sliding back to the ball slot 32 and therefore discharging their engagement and disassociating the transmission mechanism from the adaptor mechanism and backing them to standby position for a change of tool chunk 101 for another purposes.

By doing so, that the operator only needs to carry a variety of tool heads and a power tool device is ample to deal with most of the situations. Having the deployment of the guide groove 35 on the power tool device, it takes the operator just a simple turn of the switch member can easily lock or dismiss the engagement between the tool head and the power tool device, which largely avoids an accidental touch to disarm the device and greatly improves working safety.

What is claimed is:

1. A power tool device comprises a housing, a transmission mechanism installed in the housing, and an adapting mechanism deployed with a tool chuck and detachably associated with the transmission mechanism, the transmission mechanism having a motor unit, a connecting member, a guide member and a switch member, wherein, the motor unit being installed in the housing and equipped with a first transmission shaft which forms a polygon shape in sectional view;

the connecting member having a side wall which forms an accommodating space making allowance for a first bearing;

the guide member having a base embracing the side wall of the connecting member, the guide member elongating an extending wall which is penetrated with an adaptor hole on its inner wall surface and is engraved circumferentially a guide groove on its outer wall surface, and the guide groove forming a shape with one end straight stretching up and the other end slightly stretching down;

the switch member surrounding the outer wall surface of the extending wall and having an aperture which location is corresponding to that of the guide groove, a bolt inserting into the aperture, moving along the guide groove and leading the switch member to rotate around the guide member;

a connecting member has a docking member, a second transmission shaft and a tool chuck, wherein, the docking member having one end deployed with a plug, the plug forming a shape coupling with that of the adaptor hole;

the second transmission shaft installed in the docking member in a protruding manner and embedded with an outlet which forms a shape pairing with that of the first transmission shaft for engagement; and a tool chuck connects detachably to and rotates synchronously with the second transmission shaft.

2. A power tool device of claim 1, wherein an elastic member girdles onto the switch member.

3. A power tool device of claim 1, wherein the extending wall forms a positioning part on its upper peripheral and be girdled by a retaining ring.

4. A power tool device of claim 1, wherein the docking member has a plug which forms a polygon shape, and the outlet also has a polygon shape in sectional view.

5. A power tool device of claim 1, wherein the adaptor hole has a polygon shape in sectional view.

6. A power tool device of claim 1, wherein the first transmission shaft has one end deployed with a rotor and has the other end deployed with a first bearing.

7. A power tool device as in claim 1, wherein a steel ball sets into a ball slot of the guide member.

8. A power tool device of claim 1, wherein the docking member is indented with a slot.

9. A power tool device of claim 1, wherein the switch member is threaded with threshold and is girdled onto the guide member by a retaining ring.

* * * * *